United States Patent Office 3,376,196
Patented Apr. 2, 1968

3,376,196
METHOD OF AMELIORATING THE EFFECTS OF AND PREVENTING INFLUENZA INFECTIONS
George L. Dunn, Wayne, Pa., assignor to Smith Kline & French Laboratories, Philadelphia, Pa., a corporation of Pennsylvania
No Drawing. Continuation-in-part of application Ser. No. 571,197, Aug. 9, 1966. This application May 18, 1967, Ser. No. 639,293
18 Claims. (Cl. 167—65)

ABSTRACT OF THE DISCLOSURE

α-Methylcyclohexanemethylamine and α,α-dimethylcyclohexanemethylamine have been found to possess anti-influenza activity in infected mice.

This application is a continuation-in-part of copending application Ser. No. 571,197, filed Aug. 9, 1966, now abandoned, which application is a continuation-in-part of application Ser. No. 560,846, filed June 27, 1966, now abandoned.

This invention relates to a method of ameliorating the effects of and preventing influenza infections, by administering to an infected warm-blooded mammal or to such a mammal prior to infection a compound as defined in Formula I or one of its pharmaceutically acceptable acid addition salts.

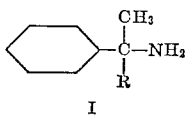

I wherein R is H or $CH_3$.

α-Methylcyclohexanemethylamine has been described many times in the literature, for example at J. Am. Chem. Soc. 80, 5270 (1958) and Tetrahedron Letters 2001 (1963). α,α-Dimethylcyclohexanemethylamine has been described in the literature in J. Prakt. Chem. 23 (3–4), 136–142 (1964). However, as far as the present inventor is aware, they have never been heretofore described as having anti-influenza activity. The present invention is based on the discovery that these compounds are effective in ameliorating the effects of and preventing influenza infections. They are particularly active aaginst influenza viruses, principally influenza A, swine strain, and influenza $A_2$, Ann Arbor strain, at dosage levels of 6.25–100 mg./kg. per day.

The compounds are used either in the form of the bases, or preferably, in the form of pharmaceutically acceptable acid addition salts thereof. They are administered either to prevent infection or to ameliorate an already existing infection by influenza virus.

One of the preferred routes of administration is orally, in the form of a tablet or capsule. A sustained release capsule is also acceptable. These compositions are formulated in a manner well-known to pharmaceutical chemists, utilizing standard pharmaceutical excipients such as lactose, starch, terra alba, magnesium stearate, calcium sulfate, glyceryl mono or distearate, gelatin, or wax. A second preferred route of administration is intranasally, as a 2–10% spray or as drops. The oral compositions may contain 50–500 mg. of compound and may be administered one or more times per day. α-Methylcyclohexanemethylamine has been found to cause a 40–100% increase in the survival of mice infected with influenza $A_2$, Ann Arbor strain and influenza A, swine strain at oral and subcutaneous doses of 6.25–100 mg./kg. of test animal per day.

Representative compositions containing α-methylcyclohexanemethylamine as its hydrochloride salt follow:

Tablet:
   α - Methylcyclohexanemethylamine hydrochloride _____ mg__ 100
   Magnesium stearate _____ do____ 2.5
   Starch _____ do____ 15
   Terra alba _____ do____ 150
   Granulate with syrup or 5% gelatin solution terra alba q.s. ad _____ do____ 300

Capsule:
   α-Methylcyclohexanemethylamine hydrochloride _____ mg__ 200
   Lactose, starch, or terra alba _____ do____ 200

Nasal solution:                         Percent w/v
   α-Mehylcyclohexanemethylamine hydrochloride _____ [1] 6.433
   Eucalyptol, N.F. _____ v./v__ 0.020
   Saccharin sodium _____ 0.050
   Thimerosal, N.F. _____ 0.001
   Potassium biphthalate _____ 0.130
   Sodium citrate _____ 0.200
   Purified water q.s. ad _____ 100.000
   [1] Equivalent to 5% base.

Compositions containing α,α-dimethylcyclohexanemethylamine or its salts are prepared using the same excipients.

Among the pharmaceutically acceptable acids which may be used for salt formation are hydrochloride, sulfuric, hydrobromic, and maleic.

I claim:

1. A method of ameliorating the effects of influenza infections comprising administering to an infected warm-blooded mammal an effective, but nontoxic, amount of a compound of the formula

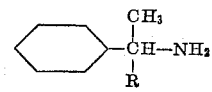

wherein R is H or $CH_3$, or a pharmaceutically acceptable acid addition salt thereof.

2. A method as claimed in claim 1, in which the compound is administered orally in the form of a tablet or capsule containing 50–500 mg. of α-methylcyclohexanemethylamine, α,α-dimethylcyclohexanemethylamine or a pharmaceutically acceptable acid addition salt thereof.

3. A method as claimed in claim 2, in which the compound is α-methylcyclohexanemethylamine or a pharmaceutically acceptable acid addition salt thereof.

4. A method as claimed in claim 2, in which the compound is α,α-dimethylcyclohexanemethylamine or a pharmaceutically acceptable acid addition salt thereof.

5. A method as claimed in claim 1, in which the compound is administered intranasally in the form of a 2–10% spray or drops.

6. A method as claimed in claim 2, in which the salt is the hydrochloride.

7. A method of preventing influenza infections comprising administering to a warm-blooded mammal an effective, but nontoxic amount of a compound as defined in claim 1 or a pharmaceutically acceptable acid addition salt thereof.

8. A method as claimed in claim 7, in which the compound is administered orally in the form of a tablet or capsule containing 50–500 mg. of α-methylcyclohexanemethylamine, α,α-dimethylcyclohexanemethylamine or a pharmaceutically acceptable acid addition salt thereof.

9. A method as claimed in claim 8, in which the compound is a α-methylcyclohexanemethylamine or a pharmaceutically acceptable acid addition salt thereof.

10. A method as claimed in claim 8, in which the compound is α,α-dimethylcyclohexanemethylamine or a pharmaceutically acceptable acid addition salt thereof.

11. A method as claimed in claim 7, in which the compound is administered intranasally in the form of a 2–10% spray or drops.

12. A method as claimed in claim 8, in which the salt is the hydrochloride.

13. An oral dosage unit in the form of a tablet or capsule for the prevention of influenza infections in warm-blooded mammals comprising 50–500 mg. of a compound as defined in claim 1 or a pharmaceutically acceptable acid addition salt thereof and a pharmaceutical carrier.

14. An oral dosage unit as claimed in claim 13, in which the compound is α-methylcyclohexanemethylamine or a pharmaceutically acceptable acid addition salt thereof.

15. An oral dosage unit as claimed in claim 13, in which the compound is α,α-dimethylcyclohexanemethylamine or a pharmaceutically acceptable acid addition salt thereof.

16. An intranasal composition for the prevention of influenza infections in warm-blooded mammals consisting of a 2–10% spray or drops comprising a compound as defined in claim 1 or a pharmaceutically acceptable acid addition salt thereof and purified water.

17. An intranasal composition as claimed in claim 16, in which the compound is α-methylcyclohexanemethylamine or a pharmaceutically acceptable acid addition salt thereof.

18. An intranasal composition as claimed in claim 16, in which the compound is α,α-dimethylcyclohexanemethylamine or a pharmaceutically acceptable acid addition salt thereof.

References Cited

Chemical Abstracts 44: 3924a (1950) (copy in P.O.S.L.).

ALBERT T. MEYERS, *Primary Examiner.*

J. GOLDBERG, *Assistant Examiner.*